(12) United States Patent
Corneille

(10) Patent No.: US 11,702,140 B2
(45) Date of Patent: Jul. 18, 2023

(54) VEHICLE FRONT OPTICAL OBJECT DETECTION VIA PHOTOELECTRIC EFFECT OF METALLIC STRIPING

(71) Applicant: Robert Bosch GmbH, Stuttgart (DE)

(72) Inventor: Michael Corneille, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 293 days.

(21) Appl. No.: 17/070,448

(22) Filed: Oct. 14, 2020

(65) Prior Publication Data

US 2021/0146923 A1    May 20, 2021

Related U.S. Application Data

(60) Provisional application No. 62/937,563, filed on Nov. 19, 2019.

(51) Int. Cl.
| | | |
|---|---|---|
| *B62D 15/02* | (2006.01) | |
| *B60W 30/12* | (2020.01) | |
| *B60W 50/14* | (2020.01) | |
| *B60W 30/09* | (2012.01) | |
| *B60W 60/00* | (2020.01) | |
| *B60W 10/20* | (2006.01) | |
| *B60W 10/18* | (2012.01) | |
| *B60W 30/06* | (2006.01) | |

(Continued)

(52) U.S. Cl.
CPC ...... *B62D 15/0285* (2013.01); *B60R 16/0231* (2013.01); *B60W 10/18* (2013.01); *B60W 10/20* (2013.01); *B60W 30/06* (2013.01); *B60W 30/09* (2013.01); *B60W 30/12* (2013.01); *B60W 50/14* (2013.01); *B60W 60/001* (2020.02); *G06V 10/245* (2022.01); *G06V 10/811* (2022.01); *G06V 20/588* (2022.01); *B60W 2420/42* (2013.01); *B60W 2552/53* (2020.02)

(58) Field of Classification Search
None
See application file for complete search history.

(56) References Cited

U.S. PATENT DOCUMENTS

| | | |
|---|---|---|
| 6,650,765 B1 | 11/2003 | Alves |
| 9,000,386 B2 | 4/2015 | Rubenstein |

(Continued)

OTHER PUBLICATIONS

Siegel, Mel. "Fluorescent paint for roadway lane-markers." IMTC 2001. Proceedings of the 18th IEEE Instrumentation and Measurement Technology Conference. Rediscovering Measurement in the Age of Informatics (Cat. No. 01CH 37188). vol. 3. IEEE, 2001. (Year: 2001).*

(Continued)

*Primary Examiner* — Russell Frejd
*Assistant Examiner* — Ana D Thomas
(74) *Attorney, Agent, or Firm* — Michael Best & Friedrich LLP

(57) ABSTRACT

A system and method for reliably determining lanes of a roadway includes an optical sensing arrangement for sensing metallic striping from photoelectric effect. The location of the striping that defines a border of a traffic lane is determined and the location of the striping is displayed on a graphical user interface. The location can be used to provide lane control to ensure the vehicle maintains proper position in a traffic lane, lane warning assistance, collision avoidance, parking control, and guidance for autonomous driving.

20 Claims, 6 Drawing Sheets

(51) Int. Cl.
 *G06V 10/24* (2022.01)
 *G06V 20/56* (2022.01)
 *B60R 16/023* (2006.01)
 *G06V 10/80* (2022.01)

(56) References Cited

U.S. PATENT DOCUMENTS

| | | |
|---|---|---|
| 9,639,764 B2 | 5/2017 | Park et al. |
| 10,310,553 B2 | 6/2019 | Choi et al. |
| 2013/0253767 A1* | 9/2013 | Lee ............... B60W 50/04 701/41 |
| 2014/0277897 A1 | 9/2014 | Saiz |
| 2014/0277939 A1 | 9/2014 | Ren et al. |
| 2015/0138324 A1 | 5/2015 | Shirai |
| 2016/0162747 A1* | 6/2016 | Singh ................ G06V 10/22 348/148 |
| 2017/0148102 A1* | 5/2017 | Franke ............ G06Q 30/0601 |
| 2018/0251946 A1 | 9/2018 | Kiel |
| 2020/0193175 A1* | 6/2020 | Okada ................ G06T 7/73 |

OTHER PUBLICATIONS

Zidek, Paul D. "Lane position tracking." Proceedings of National Aerospace and Electronics Conference (NAECON'94). IEEE, 1994. (Year: 1994).*

* cited by examiner

US 11,702,140 B2

VEHICLE FRONT OPTICAL OBJECT DETECTION VIA PHOTOELECTRIC EFFECT OF METALLIC STRIPING

RELATED APPLICATIONS

The present patent application claims the benefit of prior filed U.S. provisional patent application 62/937,563 filed on Nov. 19, 2019, the entire contents of which are hereby incorporated by reference.

RELATED APPLICATIONS BACKGROUND

This arrangement relates to a vehicle front optical object detection system that senses photons emitted from metallic striping based on photoelectric effect.

Vehicle front video cameras are known for processing objects to detect objects in front of a vehicle. The approaches include sensing texture, classifying objects, and determining structure from motion (SFM). Various sensed information is combined for redundancy in determining presence of objects and borders or lanes of a roadway.

SUMMARY

One embodiment is a system for determining lanes of a roadway, the system comprising an optical sensing arrangement secured to a vehicle for sensing front images relative to the vehicle, including sensing metallic lane striping from photoelectric effect of photoelectrons generated by light from vehicle headlights or light from other sources, and an electronic control unit including an electronic processor and a memory. The electronic processor is configured to: determine a location of the metallic lane striping defining a traffic lane based on a location of the photoelectrons emitted from the metallic lane striping that define a border of a traffic lane, and provide at least one from a group of vehicle operations consisting of: lane control to ensure the vehicle maintains proper position in a traffic lane, lane warning assistance, collision avoidance, parking control, and guidance for autonomous driving.

Another embodiment is a method for determining lanes of a roadway. The method includes: optically sensing front images relative to a vehicle, including sensing metallic lane striping from photoelectric effect of photoelectrons generated from light provided by vehicle headlights or light from other sources, and determining a location of the metallic lane striping defining a traffic lane based on a location of the photoelectrons emitted from the metallic lane striping that define a border of a traffic lane. Finally, the method includes providing at least one from a group of vehicle operations consisting of: lane control to ensure the vehicle maintains proper position in a traffic lane, lane warning assistance, collision avoidance, parking control, and guidance for autonomous driving.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable media) executable by one or more electronic controllers. For example, "units," "control units," and "controllers" described in the specification can include one or more electronic controllers, one or more memories including non-transitory computer-readable media, one or more input/output interfaces, one or more application specific integrated circuits (ASICs) and other circuits, and various connections or connectors (for example, wires, printed traces, and buses) connecting the various components.

Figure 1:
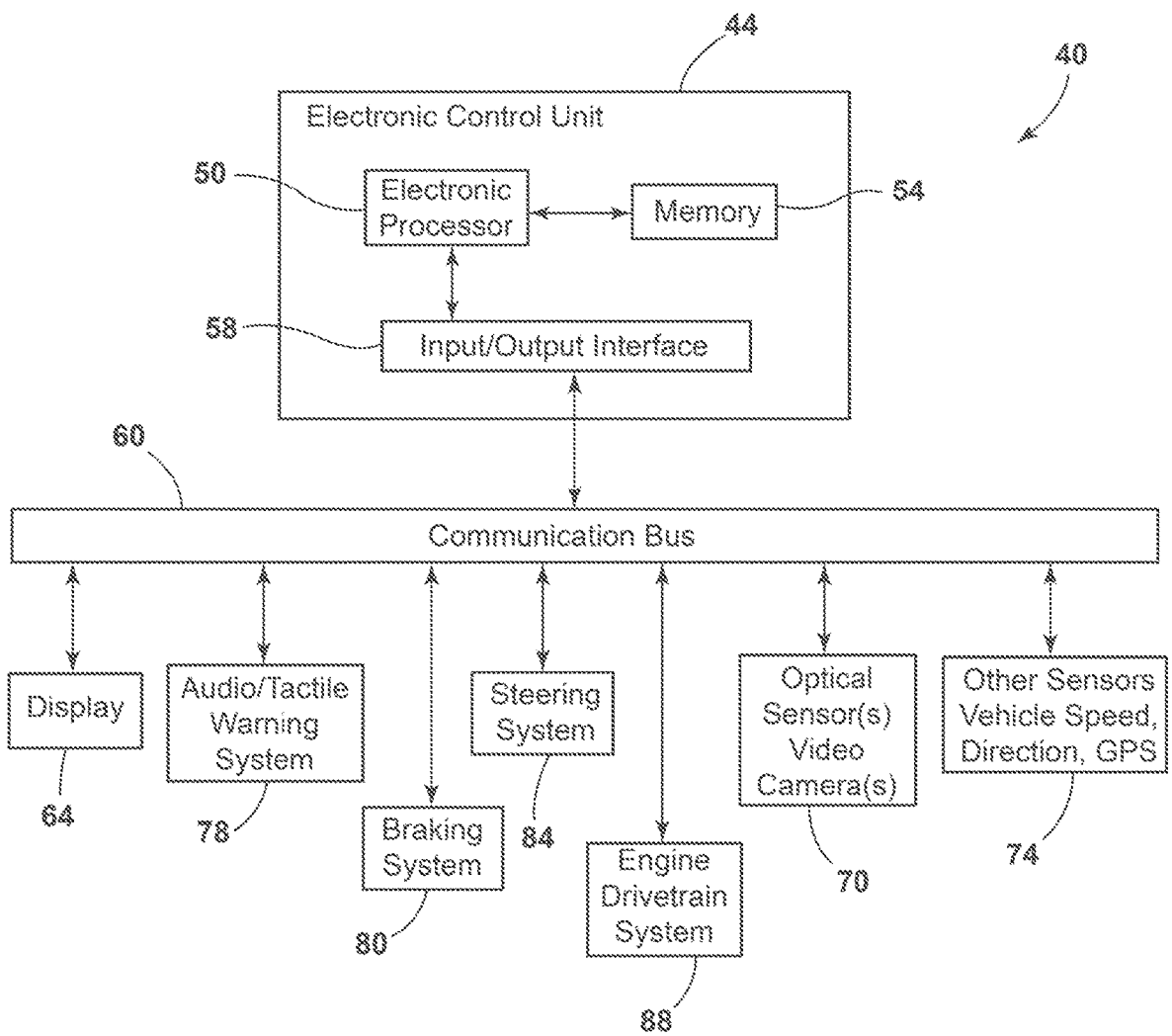
FIG. 1 illustrates a block diagram of one embodiment of a vehicle front optical object detection system for assisting in operation of a vehicle.

FIG. 1 shows a block diagram view of a vehicle front optical object detection system 40 for determining lanes and objects in front of a vehicle. In one embodiment, the vehicle front optical object detection system 40 includes an electronic control unit 44. The electronic control unit 44 includes an electronic processor 50 and a memory 54. The memory 54 includes one or more memory modules, such as a random access memory ("RAM") and an electronically erasable programmable read-only memory ("EEPROM"). An input/output interface 58 transmits and receives information over a communication bus 60. The electronic processor 50 processes the information by executing one or more applications or modules. The applications or modules can be stored as instructions or the like in the memory 54. The electronic processor 50 also stores information in the memory generated by applications.

The communication bus 60 shown in FIG. 1 is a FlexRay automotive communication bus, controller area network (CAN) bus or other type of communication link between a plurality of control units, sensors, and other devices. In some embodiments, the communication bus 60 connects the electronic control unit 44 to a display 64 or other device, such as a graphical user interface, for displaying images of a roadway taken from a front of a vehicle. In one embodiment, the display 64 and an user interface are combined in a touchscreen. In another embodiment, a user interface includes a keyboard or other input device to receive inputs.

Further, FIG. 1 shows an optical sensing arrangement that includes optical sensor(s) 70, such as video camera(s), for optically sensing front images relative to a vehicle and providing video information to the electronic control unit 44 via the communication bus 60. In one embodiment, two spaced video cameras are provided as a stereo-camera system. In one embodiment, the stereo video cameras are spaced horizontally from 25 centimeters to 50 centimeters apart. Other sensors and information 74, such as global positioning signal (GPS) information, vehicle speed and direction information, are also be provided to the electronic control unit 44 via the communication bus 60 in some embodiments.

FIG. 1 also shows an audio and/or tactile warning system 78 that include loudspeakers of a vehicle interior stereo system or other loudspeakers to provide an audio warning of improper lane change or other conditions. In some embodiments, the warning system 78 includes a tactile warning generated by vibrating the steering wheel.

FIG. 1 also shows a braking system 80 for controlling brakes, a steering system 84, and an engine drivetrain system 88. In various embodiments, the electronic control unit 44 connected to the communication bus 60 provides control signals to the systems 80, 84, 88 via the communication bus.

Figure 2:
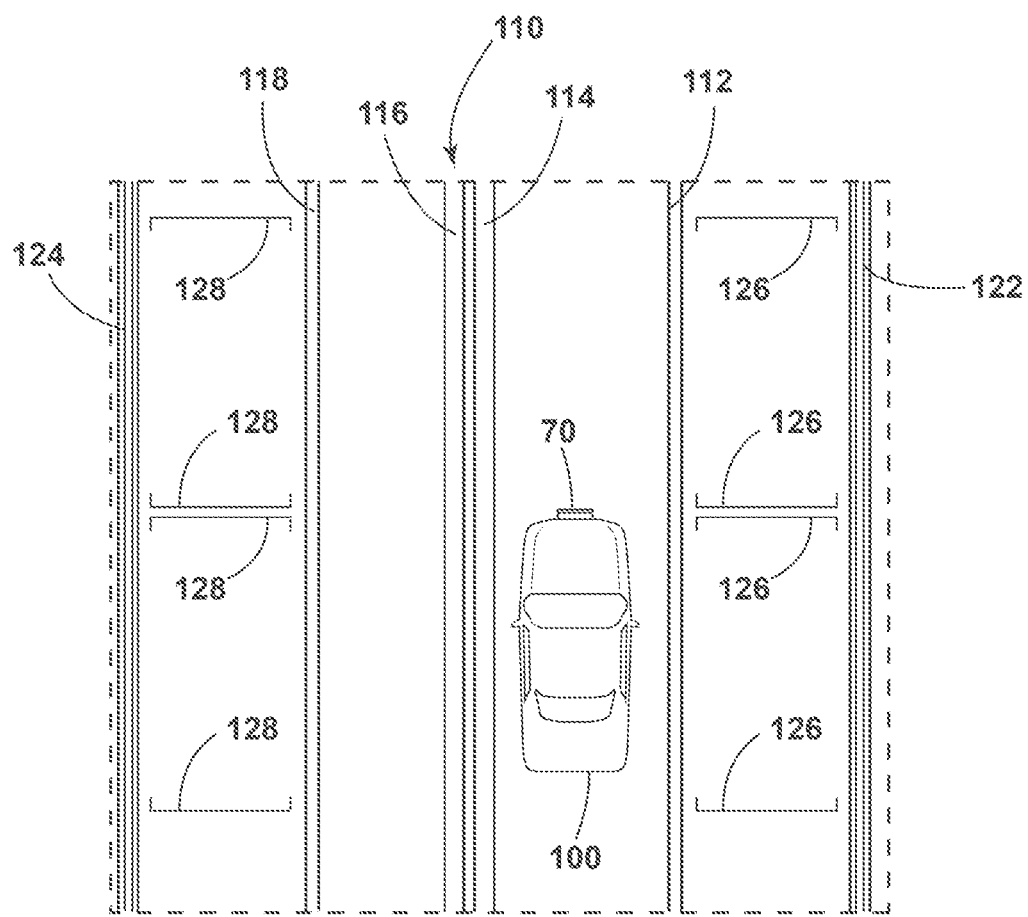
FIG. 2 illustrates a top view of a vehicle driving along a section of roadway.

FIG. 2 shows a vehicle 100 including optical sensor(s) 70 mounted or secured to a front end thereof. The vehicle 100 is on a section of a roadway 110 that includes metallic lane striping 112, 114 that define a right traffic lane and metallic lane striping 116, 118 that define a left traffic lane adjacent thereto. In some embodiments, the metallic lane striping includes one or more of powder or granules of bronze, copper, aluminum, zinc, magnetic or ferromagnetic materials. The metallic lane striping 112, 114, 116, 118 emits photoelectrons in response to light rays directed to the metallic lane striping. The photoelectrons are sensed by the optical sensor 70 mounted on the vehicle 100. The light rays applied to the metallic lane striping 112, 114, 116, 118 are from headlights of the vehicle 100 or from other light sources, such as street lights, sunlight, moonlight, or other vehicle headlights. The metallic lane striping can be formed by a metallic paint, a metallic plate, a metallic tape, or other material having a sufficient amount of metallic particles to perform a photoelectric effect. In FIG. 2, the metallic lane striping 112, 114, 116, 118 is metallic lane striping for defining borders of lanes of travel. In another embodiment, the metallic lane striping is centered in a lane and the vehicle considers the path to define or conform to a path of travel.

FIG. 2 shows vehicle curbs that include metallic curb striping 122, 124. Thus the metallic curb striping 122, 124 is provided on a top and/or inner side of a curb. In one embodiment, the curb is painted with a metallic paint. In one embodiment, the metallic curb striping 122, 124 has a different metal material such that the wavelength or frequency of the photoelectric effect of the metallic curb striping 122, 124 is distinguishable from the wavelength or frequency of the photoelectric effect of metallic lane striping 112, 114, 116, 118. Therefore, the vehicle front optical object detection system 40 can distinguish metallic lane striping from metallic curb striping.

In one embodiment, metallic parking striping 126, 128 is provided so that the vehicle front optical object detection system 40 can distinguish parking spaces for parallel parking. The metallic parking striping 126, 128 is oriented transversely and has corner lines to define individual parking spaces.

Operation

Figure 3:
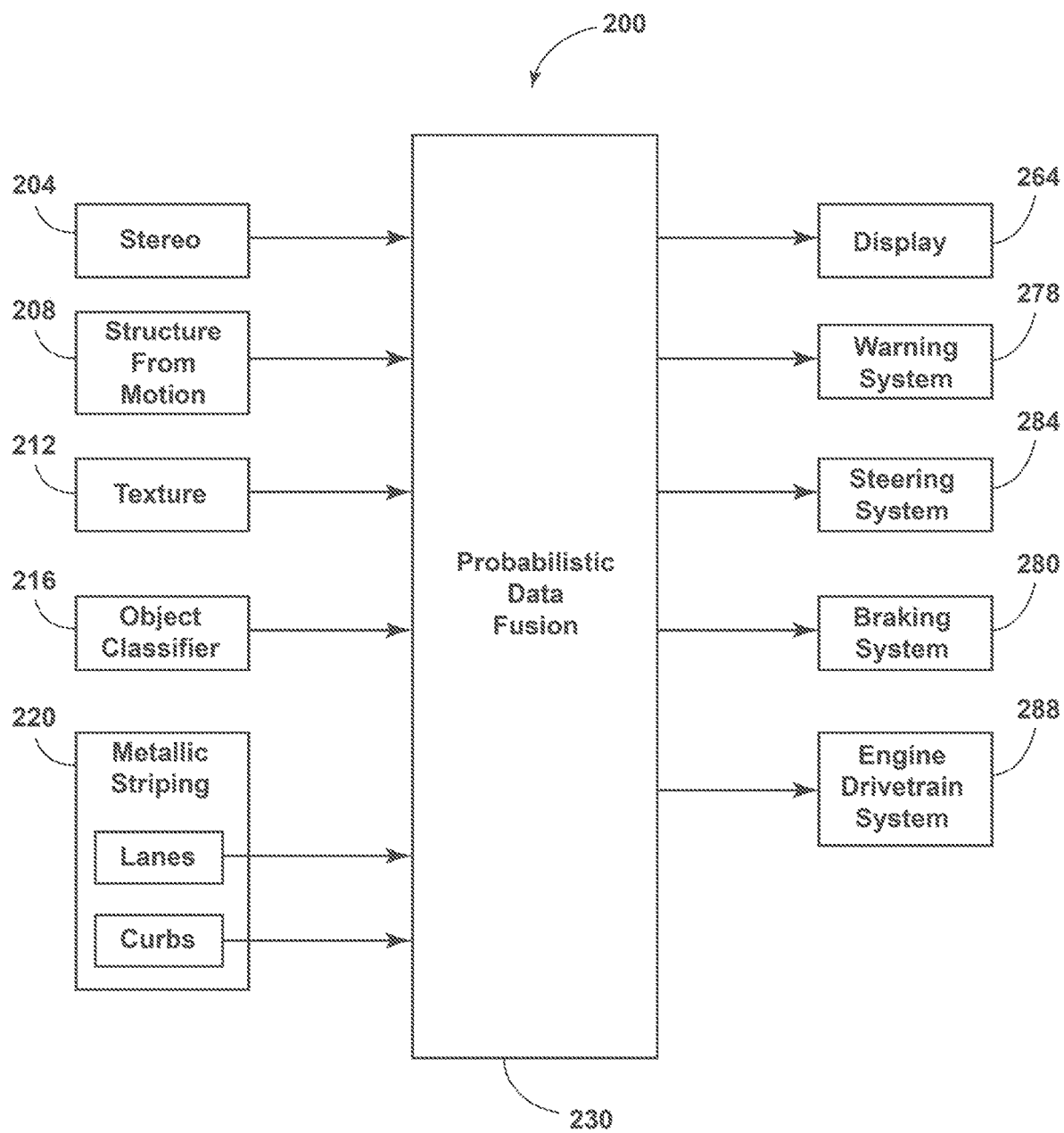
FIG. 3 illustrates a flow chart for an embodiment of operation of the vehicle object detection system.

FIG. 3 shows a flow chart 200 of the operations of the electronic control unit 44 shown in FIG. 1. While a single electronic control unit 44 is shown in FIG. 1, multiple control units and/or electronic processors can perform the various functions shown in FIG. 3. While FIG. 3 shows multiple operations or steps, not necessarily all of the operations are required. Further, the multiple steps can occur essentially simultaneously or in parallel with multiple electronic processors.

At stereo step 204, left and right frontwardly oriented video cameras 70 obtain left and right images. The images are ranked and combined to calculate the presence of objects and relative distance from the vehicle to the objects.

At structure from motion (SFM) step 208 shown in FIG. 3, consecutive frames from the video camera are compared and accounting for movement of the vehicle or vehicle speed, a calculation of the presence and or movement of objects is determined.

At texture step 212 shown in FIG. 3, the texture of objects sensed is determined by the electronic control unit 44. At classifier step 216, objects detected by the electronic control unit 44 are classified. Textures can also be identified, such as determining the presence of another vehicle in a field of view.

Figure 4:
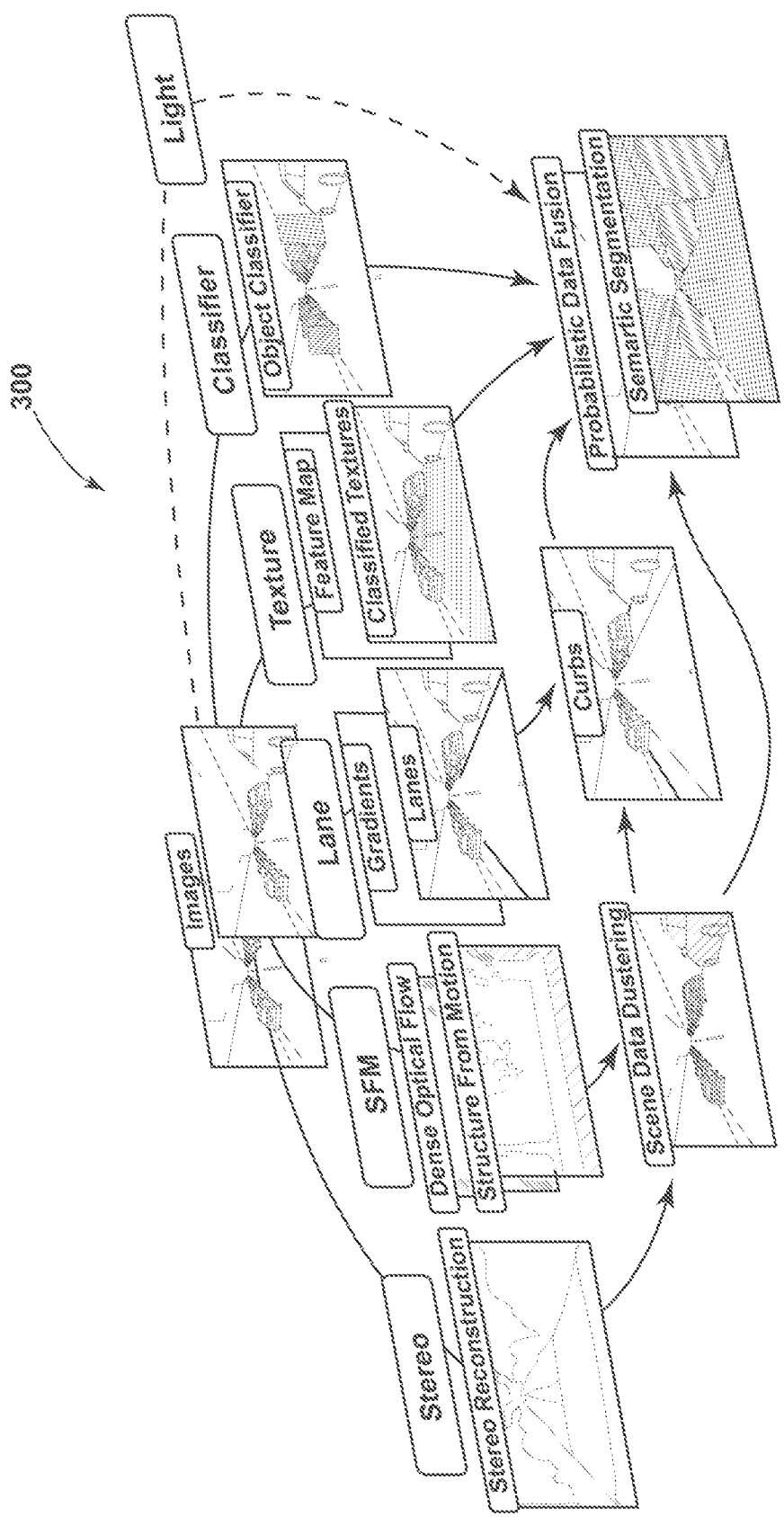
FIG. 4 illustrates graphical user interfaces output by the electronic control unit for the FIG. 3 embodiment.

At metallic striping detecting step 220 shown in FIG. 3, lanes or curbs having metallic striping are detected by photoelectrons emitted therefrom by the photoelectric effect, that are then received by the optical sensor(s) 70 or video camera(s). The photoelectric effect causes the emission of photoelectrons at specific wavelengths in some embodiments. The metallic striping can be detected as lanes and curbs as shown in the graphical user interfaces 300 shown in FIG. 4.

At probabilistic data fusion step 230 shown in FIG. 3, the various data from stereo step 204 or SFM step 208, including texture, objects classified and the photoelectric detection of metallic striping, is combined. Other properties, such as vehicle speed, direction, and GPS coordinates are also utilized in some embodiments. The combined information results in video classification of objects and metallic striping for at least one of a group of vehicle operations consisting of: lane control to ensure the vehicle maintains proper position in a traffic lane, lane warning assistance, collision avoidance, parking control, and guidance for autonomous driving.

Lane Warning Assistance and Control

In one embodiment, the traffic lanes are determined from the metallic lane striping 112, 114, 116, 118 provided on the roadway as shown in FIG. 2. The lanes are clearly determined by the electronic processor 50 and updated periodically. The position of the vehicle 100 relative to the location of the metallic lane striping 112, 114, 116, 118 is also essentially continuously updated.

As shown in the flow chart 400 of FIG. 5, the lane warning and lane control program is executed by the electronic processor 50 as follows. In a first decision step 404, the electronic processor determines whether a vehicle turn signal is operating. If turn signaling is occurring, the electronic processor 50 does not provide any alarm or further sensing. The electronic processor 50 periodically returns to decision step 404 to determine when the turn signal is in an off condition.

When the turn signal is off and not operating, the electronic processor 50 advances to decision step 408. At decision step 408, the position of the vehicle 100 relative to the metallic lane striping 112, 114 shown in FIG. 2 is determined. The metallic lane striping 112, 114 is located by using photoelectric effect. When the vehicle 100 shown in FIG. 2 is operating or begins to move outside of the appropriate lane, the electronic processor advances to step 412 and executes a program to automatically control the steering system 84, without vehicle operator input, to maintain the vehicle in the traffic lane. An operator grasping the steering wheel of the vehicle may feel the wheel turn to indicate that an automatic adjustment in direction of the vehicle 100 to return to a traffic lane is occurring. Further, one or more of a tactile warning, an audible warning, and a visual warning are provided to a vehicle operator to alert the operator to the correcting action. From providing warning and steering control, the program returns to decision step 404 and repeats the steps. If the vehicle 100 remains outside or begins to move outside a lane border of an intended or current traffic lane, the electronic processor 50 again adjusts the steering system 84 to move the vehicle toward the proper traffic lane.

Figure 5:
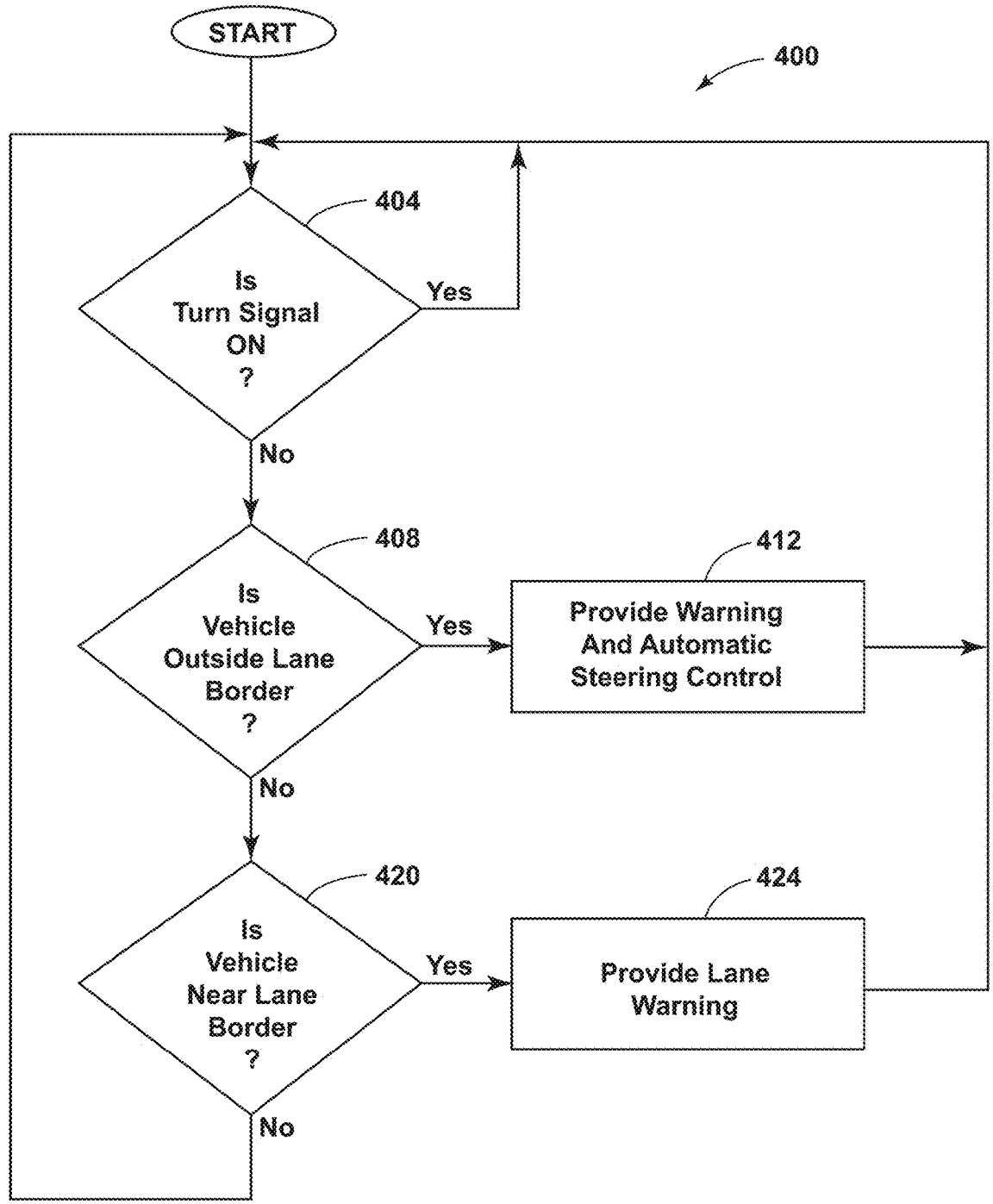
FIG. 5 illustrates a flow chart of a lane warning and lane control embodiment.

As shown in FIG. 5, when the vehicle is not outside a lane border at decision step 408, the electronic processor 50 advances to decision step 416. At decision step 416, the electronic processor determines whether the vehicle in the current traffic lane is improperly close or near to the metallic lane striping 112, 114. If so, in one embodiment the electronic processor vibrates a steering wheel of the vehicle to provide a vehicle operator with a tactile warning. In another embodiment, a visual warning is provided to the vehicle operator. In another embodiment, two or more of a tactile warning, an audible warning, and visual warning on the display 64 or another instrument panel are provided to a vehicle operator.

Collision Avoidance

In a collision avoidance embodiment, besides determining that the vehicle 100 is traveling in a proper traffic lane, the electronic processor 50 is configured to determine a location of metallic paint from a vehicle body of another vehicle in front thereof, based on a location of the photoelectrons generated from the metallic paint of the another vehicle that are sensed by the optical sensor 70. Thus, the electronic processor 50 is configured to determine the presence of a vehicle in the same traffic lane or a nearby traffic lane. In one embodiment, electronic processor 50 is configured to provide a collision avoidance warning to the interior of the vehicle when the another vehicle is detected in the same traffic lane and is either too close for the vehicle speed, or traveling toward the vehicle. The warning can be haptic, audible and/or visual. In another embodiment, the electronic processor 50 is configured to automatically control brakes of the vehicle braking system 80, and/or the steering system 84 to attempt to avoid or to minimize the possibility of a collision.

Parallel Parking

Figure 6:
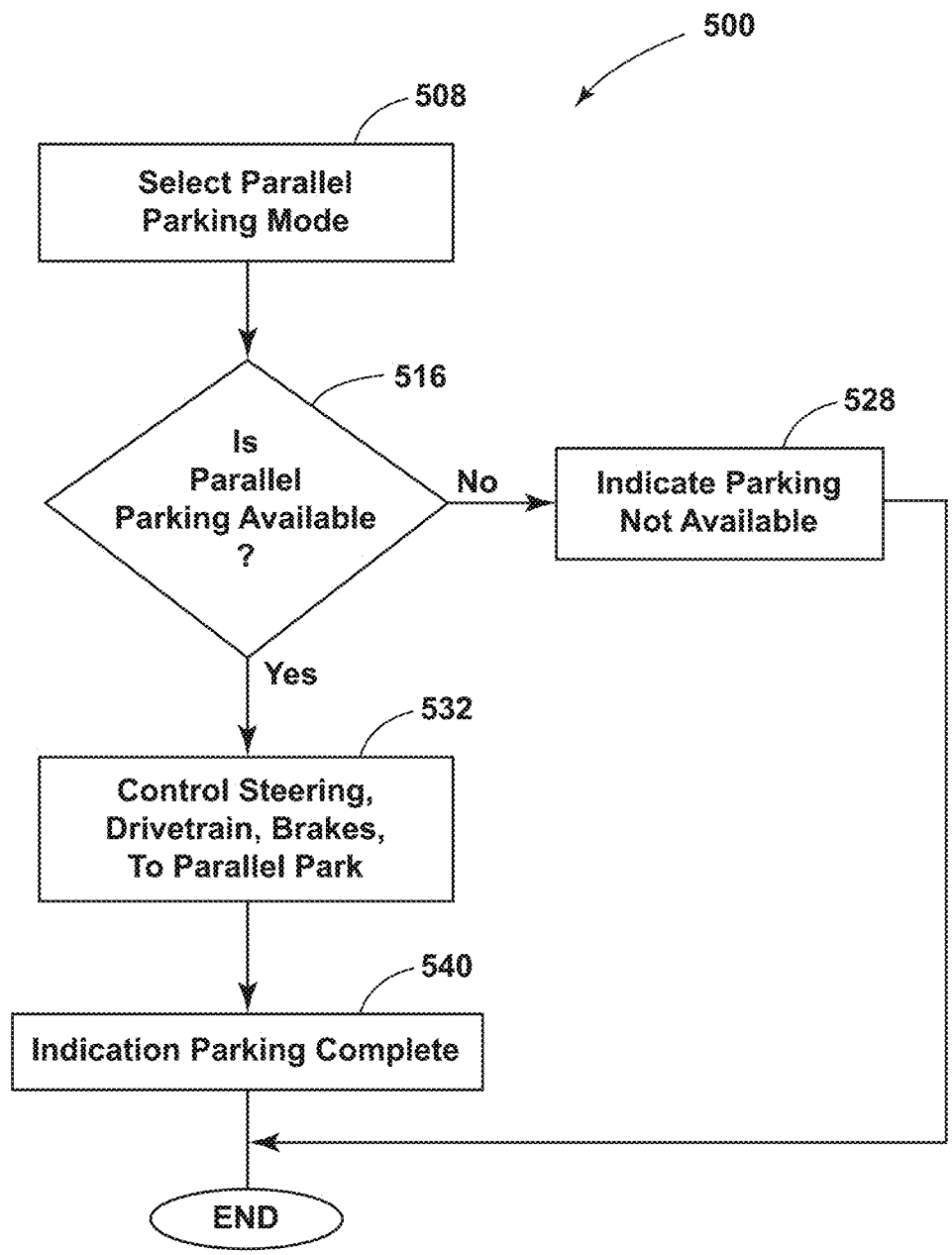
FIG. 6 illustrates a flow chart of a parallel parking embodiment.

The flow chart 500 shown in FIG. 6 sets forth an automatic parallel parking mode. In this embodiment, a rearward and/or sideward oriented optical sensors 70, such as video cameras are provided to detect the metallic curb striping 122, 124 provided for a curb, and additionally metallic parking striping 126, 128, when provided, to mark individual parking spaces as shown in FIG. 2.

In the automatic parallel parking mode, a vehicle operator provides an input to the display 64 or other input device that indicates a desire to parallel park at step 508 to begin parallel parking. At decision step 516, the electronic processor 50 determines whether the vehicle is stopped, a curb is detected by the optical sensors 70 detecting metallic curb striping and metallic parking striping by photoelectric effect, and the presence of parked vehicles to determine whether a parking space of suitable dimensions is available. If no, the electronic processor 50 provides an audible message and/or a visual message that a parking space is not available at step 528.

When the conditions are met, the electronic processor 50 advances to parking step 532 and controls the steering system 84, the braking system 80, and the engine drivetrain system 88 to parallel park the vehicle adjacent the curb defined by metallic striping 122, 124. The parking step 532 includes subroutines for operating the systems to properly park the vehicle 100 with feedback from the optical sensors 70. When metallic parking striping 126, 128 is also detected, the electronic processor is configured to only park the vehicle 100 in an empty parking space between the metallic parking striping. Therefore, the electronic processor 50 is configured to provide automatic parallel parking of the vehicle 100 adjacent the curb or metallic curb striping when the vehicle is provided in an automatic parallel parking mode and a parking space is available. Thereafter, at step 540, the electronic processor 50 provides an indication to the display 64 and/or the warning system 78 that the vehicle 100 has completed parallel parking.

Autonomous Driving or Automatic Driving

In an autonomous or automatic driving mode, the electronic processor is configured to provide autonomous driving of the vehicle 100 so long as the presence of the metallic lane striping 112, 114 defining a traffic lane is detected. While FIG. 2 shows two borders of metallic lane striping 112, 114 with the vehicle 100 in the traffic lane formed therebetween, in another embodiment, a single metallic lane striping may be provided in a center of the traffic lane that the electronic processor 50 is configured to automatically follow by control of the braking system 80, the steering system 84, and the engine drivetrain system 88.

Various features, advantages, and embodiments are set forth in the following claims.

What is claimed is:

1. A vehicle system for determining lanes of a roadway, the system comprising:
    an optical sensing arrangement including at least one video camera secured to a vehicle for sensing front images relative to the vehicle, including sensing metallic lane striping from photoelectric effect of photoelectrons generated by light from vehicle headlights or light from other sources; and
    an electronic control unit including an electronic processor and a memory, wherein the electronic processor is configured to:
        determine a location of the metallic lane striping defining a traffic lane based on a location of the photoelectrons emitted from the metallic lane striping that define a border of a traffic lane,
        determine a location of metallic paint from a vehicle body of another vehicle based on a location of the photoelectrons generated from the metallic paint of the another vehicle, and
        provide at least one from a group of vehicle operations consisting of: lane control to ensure the vehicle maintains proper position in a traffic lane, lane warning assistance, collision avoidance, parking control, and guidance for autonomous driving.

2. The vehicle system according to claim 1, wherein the electronic processor is configured to provide a vehicle interior warning when the vehicle begins to move out of a current traffic lane.

3. The vehicle system according to claim 1, wherein the electronic processor is configured to provide automatic steering control when the vehicle begins to move out of a current traffic lane without turn signaling.

4. The vehicle system according to claim 1, wherein the electronic processor is configured to:
   determine a location of metallic striping defining a curb based on a position of the photoelectrons generated from metallic curb striping that defines a border of a curb, wherein the photoelectric effect of the metallic curb striping is distinguishable from the photoelectric effect of the metallic lane striping, and
   display the location of the metallic curb striping for the curb and the magnetic lane striping for the traffic lane on a graphical user interface.

5. The vehicle system according to claim 4, wherein the electronic processor is configured to:
   determine a location of metallic parking striping based on a location of the photoelectrons emitted from the metallic parking striping that define parking spaces, and
   provide automatic parallel parking of the vehicle adjacent the curb when the vehicle is provided in an automatic parallel parking mode,
   wherein the metallic curb striping is distinguishable from the metallic lane striping due to a different metal material such that a wavelength or a frequency of the photoelectric effect of the metallic curb striping is different than a wavelength or a frequency of the photoelectric effect of the metallic lane striping.

6. The system according to claim 1, wherein the electronic processor is configured to provide autonomous driving of the vehicle so long as the presence of the metallic striping defining the traffic lane is detected.

7. The system according to claim 1, wherein the electronic processor is configured to provide a collision avoidance warning to the interior of the vehicle when the another vehicle is detected in the current traffic lane.

8. The system according to claim 7, wherein the electronic control unit including the electronic processor is connected to a communication bus for communication and control of brakes of a vehicle braking system to minimize a possibility of a collision.

9. A method for determining lanes of a roadway, the method comprising:
   optically sensing front images relative to a vehicle including at least one video camera, including sensing a metallic lane striping from photoelectric effect of photoelectrons generated from light provided by vehicle headlights or light from other sources;
   determining a location of the metallic lane striping defining a traffic lane based on a location of the photoelectrons emitted from the metallic lane striping that define a border of a traffic lane,
   determining a location of metallic paint from a vehicle body of another vehicle based on a position of the photoelectrons emitted from the metallic paint of the another vehicle, and
   providing at least one from a group of vehicle operations consisting of: lane control to ensure the vehicle maintains proper position in a traffic lane, lane warning assistance, collision avoidance, parking control, and guidance for autonomous driving.

10. The method according to claim 9, including providing a vehicle interior warning when the vehicle begins to move out of a current traffic lane.

11. The method according to claim 9, including the step of providing automatic steering control when the vehicle begins moving out of a current traffic lane without signaling.

12. The method according to claim 9, including the steps of:
    determining a location of metallic curb striping defining a curb based on a position of the photoelectrons emitted from the metallic curb striping that defines a border of the curb, wherein the photoelectric effect of the metallic curb striping is distinguishable from the photoelectric effect of the metallic lane striping, and
    displaying the location of the metallic curb striping for the curb and the metallic lane striping for the lane on a graphical user interface.

13. The method according to claim 12, including:
    determining a location of metallic parking striping based on a location of the photoelectrons emitted from the metallic parking striping that define parking spaces, and
    providing automatic parking of the vehicle adjacent the curb when the vehicle is provided in an automatic parallel parking mode,.
    wherein the metallic curb striping is distinguishable from the metallic lane striping due to a different metal material such that a wavelength or a frequency of the photoelectric effect of the metallic curb striping is different than a wavelength or a frequency of the photoelectric effect of the metallic lane striping.

14. The method according to claim 9, including providing automatic driving of the vehicle so long as the presence of the metallic lane striping defining the traffic lane is detected.

15. The method according to claim 9, including providing a collision avoidance warning to the interior of the vehicle when the another vehicle is detected in the current traffic lane.

16. The method according to claim 9, wherein the electronic control unit including the electronic processor is connected to a communication bus for communication and control of brakes of a vehicle braking system.

17. A vehicle system for determining lanes of a roadway, the system comprising:
    an optical sensing arrangement secured to a vehicle for sensing front images relative to the vehicle, including sensing metallic lane striping from photoelectric effect of photoelectrons generated by light from vehicle headlights or light from other sources;
    an electronic control unit including an electronic processor and a memory,
    wherein the electronic processor is configured to:
       determine a location of the metallic lane striping defining a traffic lane based on a location of the photoelectrons emitted from the metallic lane striping that define a border of a traffic lane,
       determine a location of metallic curb striping defining a curb based on a location of the photoelectrons emitted from the metallic curb striping, wherein the photoelectric effect of the metallic curb striping is distinguishable from the photoelectric effect of the metallic lane striping,
       display the metallic lane striping defining traffic lanes and the metallic curb striping that defines a border of a curb on a graphical user interface, and
       provide at least one from a group of vehicle operations consisting of: lane control to ensure the vehicle maintains proper position in a traffic lane, lane warning assistance, collision avoidance, parking control, and guidance for autonomous driving.

18. The system according to claim 17, wherein the electronic processor is configured to:
- determine a location of metallic parking striping based on a location of the photoelectrons emitted from the metallic parking striping that define parking spaces, and
- provide automatic parallel parking of the vehicle adjacent the curb when the vehicle is provided in an automatic parallel parking mode.

19. The system according to claim 18, wherein the metallic curb striping is distinguishable from the metallic lane striping due to a different metal material such that a wavelength or a frequency of the photoelectric effect of the metallic curb striping is different than a wavelength or a frequency of the photoelectric effect of the metallic lane striping.

20. The system according to claim 17, wherein the metallic curb striping is distinguishable from the metallic lane striping due to a different metal material such that a wavelength or a frequency of the photoelectric effect of the metallic curb striping is different than a wavelength or a frequency of the photoelectric effect of the metallic lane striping.

* * * * *